US006400817B1

(12) United States Patent
Su et al.

(10) Patent No.: US 6,400,817 B1
(45) Date of Patent: Jun. 4, 2002

(54) MULTIPLE-FUNCTION DIGITAL TELEPHONE SET IN A PRIVATE BRANCH EXCHANGE

(75) Inventors: Kao-Ping Su, Brae; Hani Al-Hemsi, Anaheim, both of CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/218,986

(22) Filed: Dec. 22, 1998

(51) Int. Cl.$^7$ .................. H04M 3/42; H04M 1/247; H04M 3/523
(52) U.S. Cl. .................. 379/201.05; 379/93.29; 379/245; 379/265.02; 379/914
(58) Field of Search .................. 379/157, 201, 379/93.17, 93.29, 914, 915, 916, 201.01, 201.04, 201.05, 245, 246, 265.02

(56) References Cited

U.S. PATENT DOCUMENTS 6,058,167 A * 5/2000 Iglehart et al. ......... 379/201 X
6,266,404 B1 * 7/2001 Chon et al. ............. 379/916 X
6,304,646 B1 * 10/2001 Liot et al. ............... 379/916 X

* cited by examiner

Primary Examiner—Harry S. Hong
(74) Attorney, Agent, or Firm—Jenkens & Gilchrist, P.C.

(57) ABSTRACT

A system, method, and apparatus for changing the functional mode of a telephone terminal in a private branch exchange (PBX) is presented. A user can issue a command via the keypad indigenous to a telephone terminal, causing the telephone terminal to transmit a request to an interface module, requesting a change in the functional mode of operation of the requesting phone. The interface module responds by causing the software module supporting the current functional mode of operation of the telephone terminal to terminate the logical software link to the telephone terminal and causing the software module supporting the requested functional mode of operation to establish a logical software link to the telephone terminal, thereby changing the functional mode of operation of the telephone terminal.

18 Claims, 5 Drawing Sheets

MULTIPLE-FUNCTION DIGITAL TELEPHONE SET IN A PRIVATE BRANCH EXCHANGE

DESCRIPTION OF RELATED ART

A private branch exchange (PBX) is a circuit switch that serves a community of terminals, such as telephones, facsimile machines, and computers. By interconnecting the terminals, the PBX provides an inexpensive and convenient communication network among the community of terminals. The PBX is also connected to nodes in the public switched telephone network (PSTN), thereby providing communication paths to terminals outside the network. Many PBXs also provide a number of special services.

The PBX interconnects the terminals using voice and data lines which are connected to a digital switch via a voice or data interface card. The PBX is connected to the PSTN by a set of trunk lines which are connected to the digital switch via a trunk interface card. The PBX also includes a line scanner for monitoring and detecting activity on the voice, data, and trunk lines.

The PBX is controlled by a processing unit which responds to activity indications from the line scanner, allocates switching resources and service circuits as needed, maintains the connection for the duration of each call, returns the resources to idle state to await other calls, and supports numerous service features such as voice mail, call transfer, and conference calls. The processing unit also supports a user interface through which a user can control the operation of various features of the PBX.

The user interface is usually similar to a user interface of a computer system. The processing unit receives inputs from the user through a keyboard or mouse and displays outputs on a visual display. By inputting various commands, the user can cause the PBX to perform various requested operations. Additionally, many PBXs include an integrated database which can store user name/extension pairs and other information. The processing unit allows the user to access the information in a quick and reliable manner. By providing the user with the foregoing functions, the user at the user interface is well situated to act as a system administrator for the PBX.

The telephone terminals connected to the PBX operate in one of three different modes. In each functional mode, the telephone terminal operates in the way that meets the user's communication needs according to the task the user is performing. This is achieved by providing an informative visual display and arrays of programmable keys on the terminal to invoke frequently used service features that are designed for the functional mode. In a regular user mode, the user is able to receive incoming calls directed to a particular directory number and make outgoing calls. In an operator mode, the user is able to answer and route calls directed to the PBX to a particular one of the telephone terminals. In an Automatic Call Distribution (ACD) agent mode, the user can answer calls which are directed to one or multiple subgroups of the PBX.

In many cases, the functional mode of a particular telephone terminal is predefined and impossible to change. In other cases, the functional mode of a telephone can only be changed by a PBX system administrator. Because the operator telephone terminal and ACD agent telephone terminal are stationary, the mobility of the operator and the ACD agent are confined to the proximate area of the operator telephone terminal or the ACD agent telephone terminal.

The foregoing imposes a number of undesirable limitations which affect the operation of the PBX. For example, quite often a secretary who answers a particular telephone terminal is also be asked to act as an operator or an ACD agent. Where the secretary's telephone terminal is not in the proximate area of the operator terminal or the ACD agent terminal, the restriction on the mobility of the operator or ACD agent becomes unduly inconvenient.

It is therefore an object of the present invention to remove restrictions on the mobility of PBX operators and ACD agents.

It is also an object of the present invention to simplify changing functional modes of telephone terminals in PBX systems.

SUMMARY OF THE INVENTION

The present invention is directed to a system, method, and apparatus for changing the functional mode of operation of a telephone terminal in a private branch exchange (PBX) by receiving a request from the telephone terminal to change the functional mode, deactivating the current functional mode of operation, and activating the new functional mode of operation for the telephone terminal.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF PRESENTLY PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
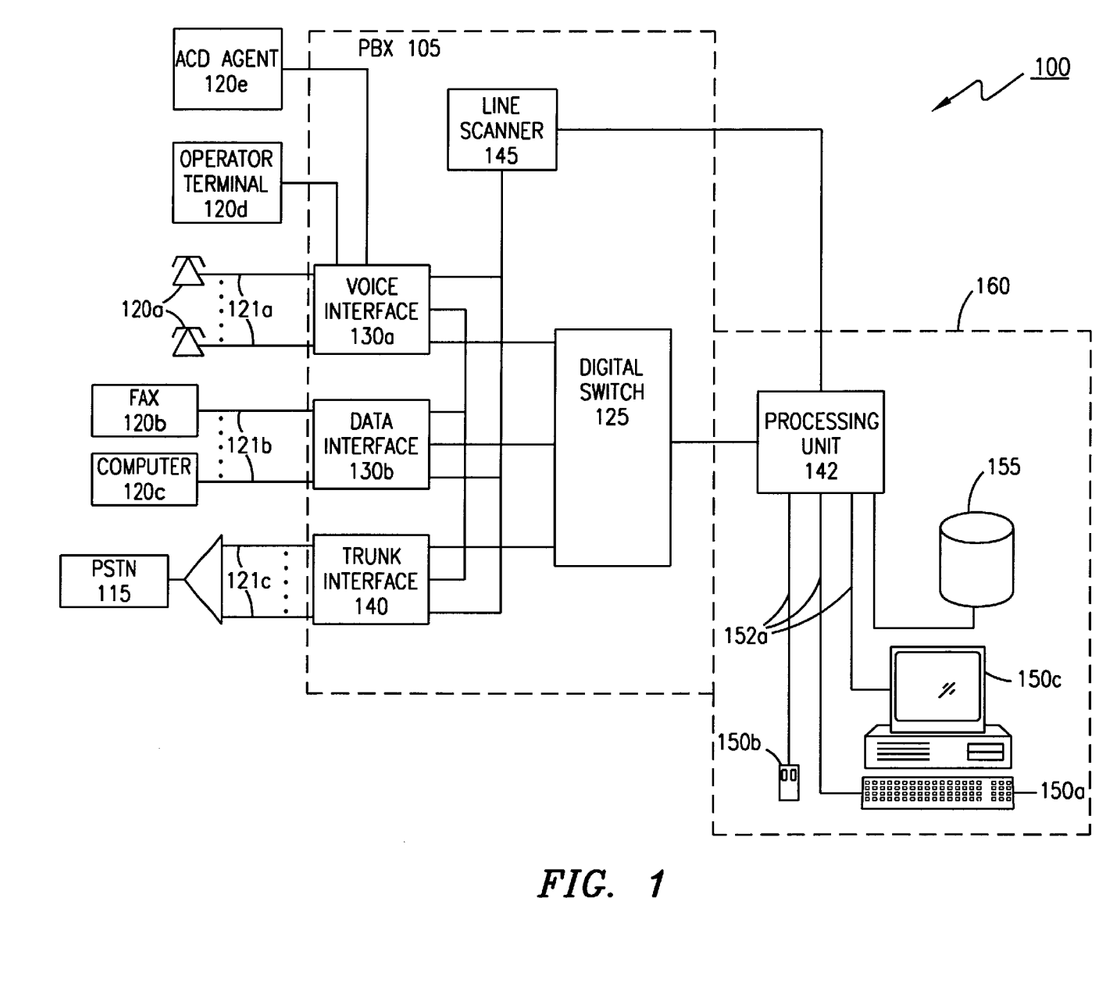
FIG. 1 is an exemplary Private Branch Exchange (PBX) system.

Referring now to FIG. 1, a Private Branch Exchange (PBX) system 100 is illustrated. The PBX system includes a PBX 105 serving any number of telephone terminals 120, such as telephones 120a, facsimile machines 120b, and computers 120c. By interconnecting the terminals 120, the PBX 105 provides an inexpensive and convenient communication network among the community of telephone terminals. The PBX 105 is also connected to nodes in the public switched telephone network (PSTN) 115, thereby providing communication paths to terminals outside the PBX system 100 (not shown).

The PBX interconnects the telephone terminals 120 using voice and data lines 121a, 121b which are connected to a digital switch 125 via a voice or data interface card 130a, 130b. The PBX 105 is connected to the PSTN by a set of trunk lines 121c which are connected to the digital switch 125 via a trunk interface card 140. The PBX also includes a line scanner 145 for monitoring and detecting activity on the voice, data, and trunk lines 121a, 121b, 121c.

The PBX system 100 is controlled by a processing unit 142 which responds to activity indications from the line scanner 145, allocates switching resources and service circuits as needed, maintains the connection for the duration of each call, returns the resources to idle state to await other calls, and supports numerous service features such as voice mail, call transfer, and conference calls. The processing unit 142 also supports a user interface 150 connected to the processing unit via a set of cords 152a through which a user can control the operation of various features of the PBX.

The user interface 150 is usually similar to a user interface of a computer system. The processing unit 142 receives inputs from the user through input means such as a keyboard 150a or mouse 150b and displays outputs on output means such as a visual display 150c. By inputting various commands, the user can cause the PBX 105 to perform various requested operations. Additionally, many PBXs systems include an integrated database 155 which can store user name/extension pairs and other information. The processing unit 142 allows the user to access the information in a quick and reliable manner.

In some PBX systems 100, the processing unit 142, the user interface 150 and the integrated database 155 form a computer system 160 connectable to the PBX 105. In other PBX systems 100, the processing unit 142, the user interface 150, and the integrated database 155 are completely integrated and physically form a portion of the PBX 105. By providing a user with the foregoing functionality, the user at the user interface 150 is well situated to act as a system administrator for the PBX.

The telephone terminals 120 connected to the PBX operate in one of three different modes—a regular user mode, an operator mode, and an ACD agent mode. The foregoing modes of operation are supported by active software modules executed by the processing unit 142. In a regular user mode, the user is able to receive incoming calls directed to a particular directory number and make outgoing calls. In an operator mode 120d the user is able to route calls directed to the PBX to a particular one of the telephone terminals 120. In an Automatic Call Distribution (ACD) agent mode 120e, the user can receive calls directed to a subgroup of the PBX 100.

In many cases, the functional mode of a particular telephone terminal 120 is predefined and impossible to change. In other cases, the functional mode of a telephone can only be changed by a PBX system administrator. Because the operator telephone terminal 120d and ACD agent telephone terminal 120e are stationary, the mobility of the operator and the ACD agent are confined to the proximate area of the operator telephone terminal or the ACD agent telephone terminal.

The foregoing imposes a number of limitations which affect the operation of the PBX 100. For example, quite often a secretary who answers a particular telephone terminal is also be asked to act as an operator or an ACD agent. Where the secretary's telephone terminal is not in the proximate area of the operator terminal 120d or the ACD agent terminal 120e, the restriction on the mobility of the operator becomes unduly inconvenient.

The restriction on mobility of the operator can be removed by the use of multiple-function digital telephone sets which allow each of the telephone sets 120 to be operated in each of the functional modes. The user of the PBX system 100, depending on the task performed, can select the appropriate functional mode from their telephone set 120 by issuing a change order which is sent from the telephone set to the processing unit 142.

Figure 2:
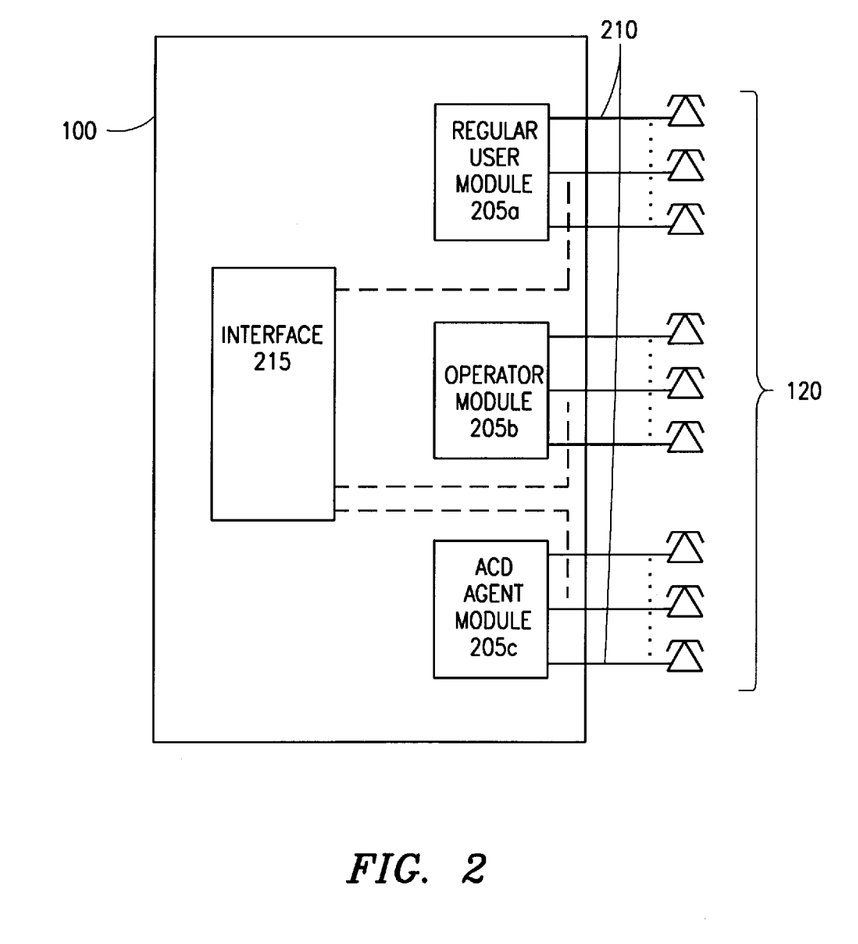
FIG. 2 is a software model of the PBX configured in accordance with the present invention.

Referring now to FIG. 2, there is illustrated an exemplary software model of a PBX system 100 configured in accordance with the present invention. The various modes of operation of the telephone terminals 120 connected to the PBX system 100 are supported by active software modules 205 executed by the processing unit 142. Each active software module 205 comprises executable computer instructions that provide the functionality of a particular mode of operation. The active software modules 205 include a Regular User module 205a to support a regular user functionality, an Operator module 205b which supports operator functionality, and an ACD agent module 205c which supports ACD agent functionality. The telephone terminals 120 are associated with a particular active software module 205 via a logical software link 210, wherein the telephone terminal 120 operates in the functional mode supported by the active software module 205 associated with the telephone terminal 120. Those skilled in the art will recognize that the logical software link 210 can be realized by, for example, what is known in the art as a client/server connection wherein the active software module 205 is the server and the telephone terminal 120 is the client.

To permit a user to change the functional mode of a telephone terminal 120, a PBX system interface module 215 is added. Each telephone terminal 120 is capable of communicating a request to change from a current functional mode to a new functional mode which is received by the PBX system interface module 215, responsive to receiving an appropriate command by a user via the keypad (not shown) indigenous to the telephone terminal 120. When the PBX system interface module 215 receives the request, the PBX system interface module 215 responds by causing the active software module 120 supporting the current mode of operation to terminate the logical software link 210 to the requesting telephone terminal 120, and causing the active software module 205 supporting the new functional mode of operation to establish a logical software link 210 to the requesting telephone terminal, thereby changing the functional mode of the telephone terminal.

Figure 3:
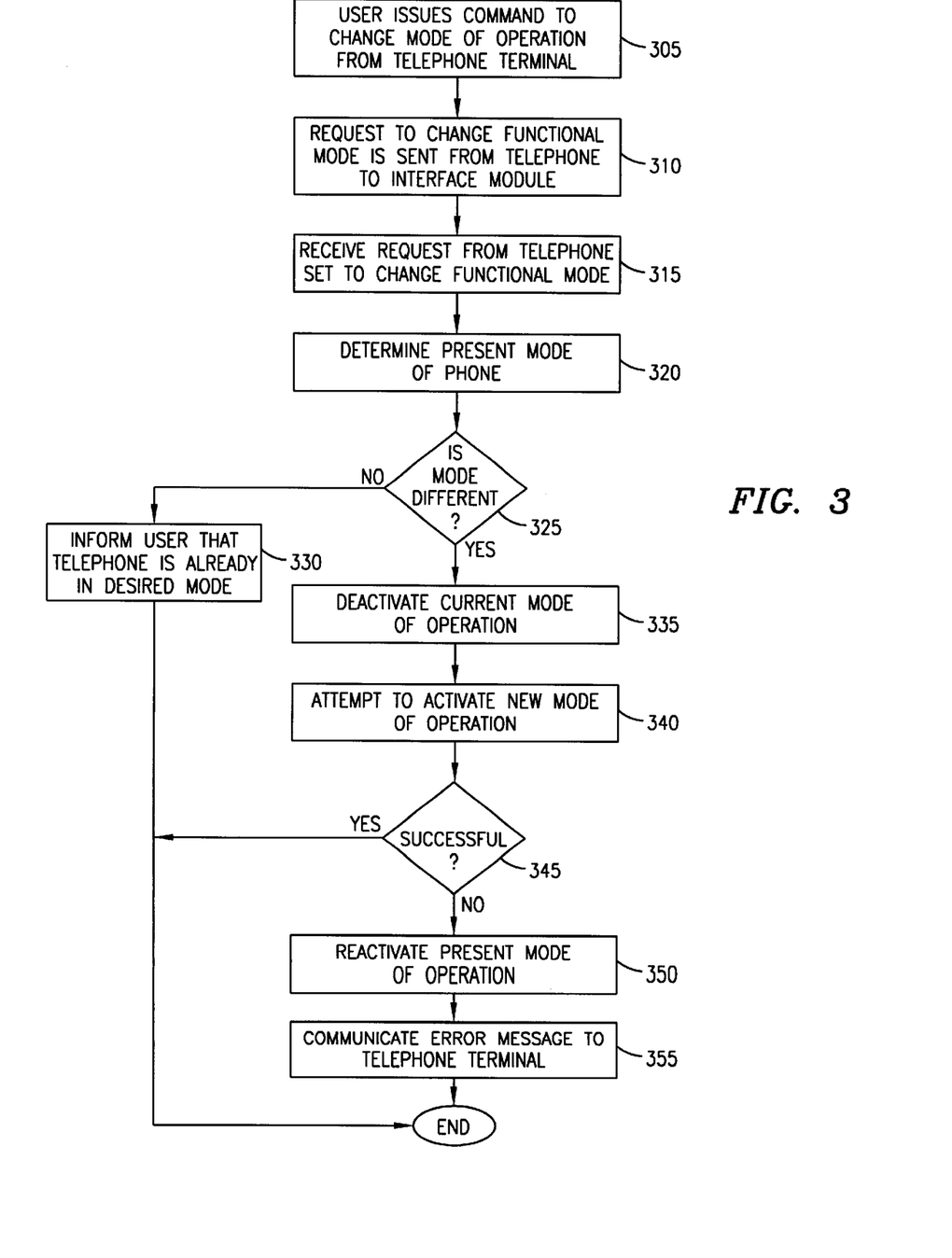
FIG. 3 is a flow diagram illustrating the operation of the PBX system interface module in accordance with the present invention.

Referring now to FIG. 3, there is illustrated a flow diagram describing the operation of the PBX system interface module 215 in accordance with the present invention. At step 305, the user issues a command to change the functional mode of a requesting telephone terminal 120 from a current functional mode to a new functional mode at the requesting telephone terminal 120. The requesting telephone terminal 120 responds by transmitting a request to change the functional mode of the telephone terminal 120 (step 310) which is received by the PBX system interface module 215 (step 315). The PBX system interface module 215 analyzes the request by determining the current functional mode of the requesting telephone terminal 120 (step 320) and whether the current functional mode of the requesting telephone terminal 120 is different from the new functional mode (step 325). If the current functional mode and the new functional mode are the same, then the interface module 215 transmits a message to the requesting telephone terminal 120 that the requesting telephone terminal 120 is currently operating in the new functional mode (step 330) and the steps are completed.

On the other hand, where the current functional mode and the new functional mode are different, the PBX system interface module 215 causes the active software module 205 supporting the current functional mode to disconnect the logical software link 210 to the telephone terminal 120 (step 335) and causes the active software module 205 supporting the new functional mode to attempt to establish a logical software link 210 to the requesting telephone terminal 120 (step 340).

At step 345, the PBX system interface module 215 determines whether the attempt during step 340 was successful. Where the attempt during step 340 was successful, the telephone terminal 120 operates in the new functional mode at the steps are completed. On the other hand, where the attempt during step 340 was unsuccessful, the PBX system interface module 215 causes the active software module 120 supporting the current functional mode to reestablish a logical software link 210 to the requesting telephone terminal 120 (step 350) and transmits an error message to the requesting telephone terminal 120 (step 355).

Figure 4:
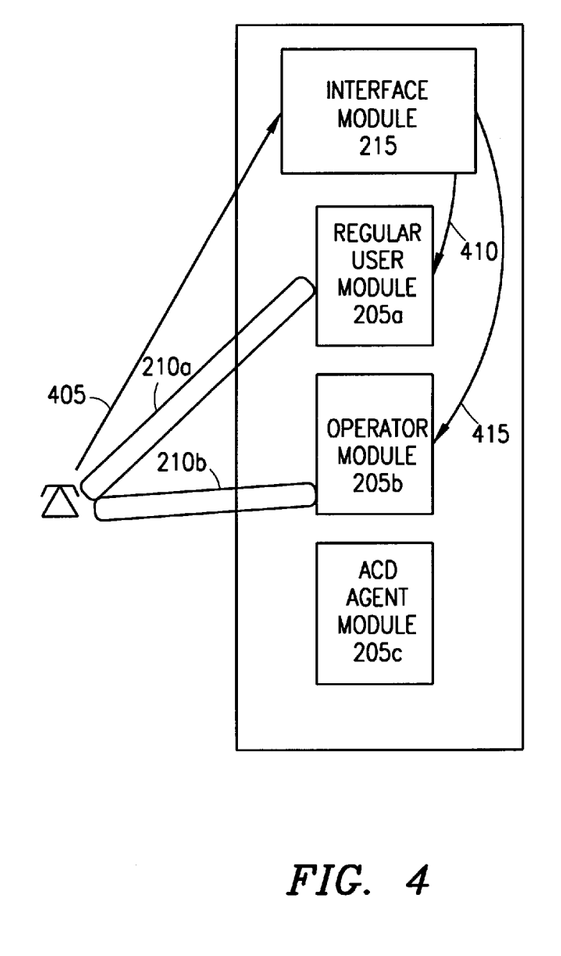
FIG. 4 is a signal flow diagram in an exemplary case wherein a user at telephone terminal currently operating in a first functional mode changes the functional mode of the telephone terminal to second functional mode.

The present invention is better understood by the following illustrative example. Referring now to FIG. 4, there is illustrated a signal flow diagram in an exemplary case wherein a user at telephone terminal 120 currently operating in a regular user mode changes the functional mode of the telephone terminal to an operator mode. By issuing a command via the keypad indigenous to the requesting telephone terminal 120, the user causes the requesting telephone terminal 120 to transmit a request (signal 405) to the PBX system interface module 215 to change the current functional mode (regular user mode) to a new functional mode (operator mode). The PBX system interface module 215 responds by requesting (signal 410) the active software module supporting the current functional mode, the regular user module 205a, to terminate the logical software link 210a to the requesting telephone terminal 120. The PBX system interface module 215 then requests (signal 415) the active software module supporting the new functional mode, the operator module 205b to attempt to establish a logical software link 210b to telephone terminal 120, thereby changing the functional mode of telephone terminal 120 from a regular user mode to an operator mode.

Figure 5:
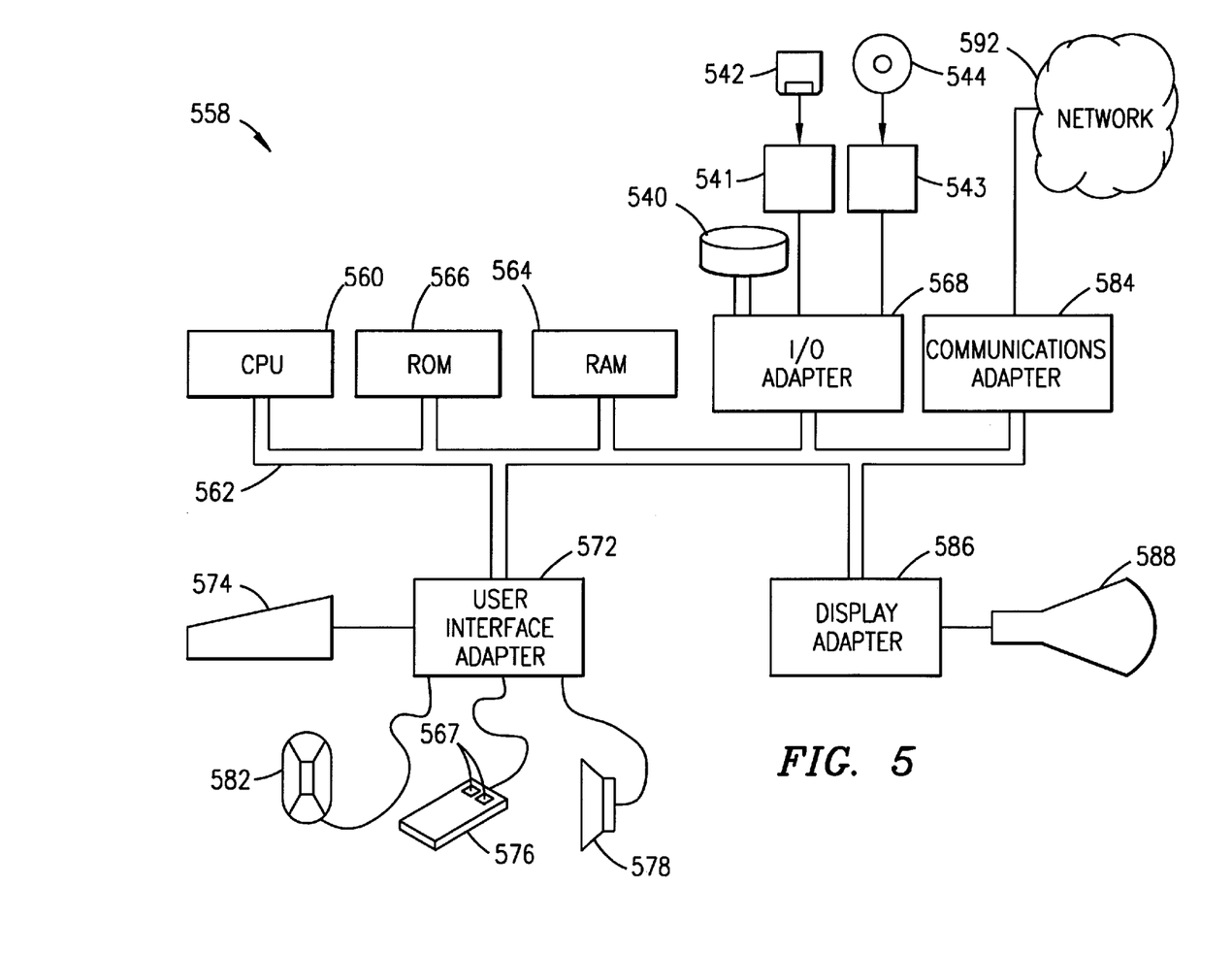
FIG. 5 is a block diagram of a representative hardware environment for practicing the present invention.

Referring now to FIG. 5, there is shown a representative hardware environment 558 for storing the PBX system interface module 215. A CPU 560, such as processing unit 142, is interconnected via system bus 562 to random access memory (RAM) 564, read only memory (ROM) 566, an input/output (I/O) adapter 568, a user interface adapter 572, communications adapters 584, and a display adapter 586. The input/output (I/O) adapter 568 connects peripheral devices such as hard disc drives 540, floppy disc drives 541 for reading removable floppy discs 542, and optical disc drives 543 for reading removable optical disc 544 (such as a compact disc or a digital versatile disc) to the bus 562. The user interface adapter 572 connects devices such as a keyboard 574, a mouse 576 having a plurality of buttons 567, a speaker 578, a microphone 582, and/or other user interfaces devices such as a touch screen device (not shown) to the bus 562. The display adapter 586 connects a monitor 588 to the bus 562. The communications adapters 584 connect the computer system to a data processing network 592. The data processing network 592 may include any number of computer systems, as well as mass storage elements such as another hard disc drive 540, or another optical disc drive 543 for reading optical discs 544.

The PBX system interface module 215 can be implemented as sets of instructions resident in the random access memory 564 of in the hardware environment 558 configured generally as described in FIG. 5. Until required by the PBX system 100, the set of instructions may be stored in another computer readable memory, for example in a hard disc drive 540, or in removable memory such as an optical disc 544 for eventual use in an optical disc drive 543, or a floppy disc 542 for eventual use in a floppy disc drive 541.

As will be recognized by those skilled in the art, the innovative concepts described in the present application is capable of numerous modifications without departing from the spirit of the invention. Accordingly, the scope of the patent subject matter should not be limited to any of the specific exemplary teachings discussed, but is only limited by the following claims.

What is claimed is:

1. In a communications system supporting a plurality of telephone terminals attached thereto, a method for changing the functional mode of at least one of said plurality of telephone terminals operating in a first functional mode to a second functional mode, said method comprising the steps of:

receiving a request from said telephone terminal to change the functional mode of said telephone terminal from said first functional mode to said second functional mode;

deactivating said first functional mode of operation; and activating said second functional mode of operation, wherein said first and second functional modes allow said telephone terminal to invoke service features designed for each of said respective first and second functional modes;

wherein said first functional mode and said second functional mode are selected from a group consisting of a regular user mode, an operator mode and an Automatic Call Distribution agent mode.

2. The method of claim 1, wherein said step of deactivating said first functional mode of operation further comprises the step of:

terminating a logical software link between an active software module supporting said first functional mode and said telephone terminal.

3. The method of claim 1, wherein said step of activating said second functional mode of operation further comprises the step of:

establishing a logical software link between an active software module supporting said second functional mode and said telephone terminal.

4. The method of claim 3, wherein said logical software link comprises a client/server connection.

5. The method of claim 1, wherein said step of receiving said request further comprises the step of:

receiving said request at an interface module.

6. The method of claim 5, wherein said step of deactivating said first functional mode further comprises the step of:

requesting a first active software module, said first active software module supporting said first functional mode, to terminate a logical software link to said telephone terminal, by said interface module.

7. The method of claim 5, wherein said step of activating said second functional mode further comprises the step of:

requesting a second active software module, said second active software module supporting said second functional mode, to establish a logical software link to said telephone terminal, by said interface module.

8. In a communication system supporting a plurality of telephone terminals connected thereto, an article of manufacture comprising a computer usable medium having computer readable program code means embodied thereon for changing the functional mode of at least one of said plurality of telephone terminals operating in a first functional mode to a second functional mode, the computer readable program code means comprising means for:

receiving a request from said telephone terminal to change the functional mode of said telephone terminal from said first functional mode to said second functional mode;

deactivating said first functional mode of operation; and activating said second functional mode of operation, wherein said first and second functional modes allow said telephone terminal to invoke service features designed for each of said respective first and second functional modes;

wherein said first functional mode and said second functional mode are selected from a group consisting of a regular user mode, an operator mode and an Automatic Call Distribution agent mode.

9. The article of manufacture of claim 8, wherein said means for deactivating said first functional mode of operation further comprises means for:

terminating a logical software link between an active software module supporting said first functional mode and said telephone terminal.

10. The article of manufacture of claim 9, wherein said means for activating said second functional mode of operation further comprises means for:

establishing a logical software link between an active software module supporting said second functional mode and said telephone terminal.

11. The article of manufacture of claim 10, wherein said logical software link comprises a client/server connection.

12. The article of manufacture of claim 8, wherein said means for receiving said request further comprises an interface module.

13. The article of manufacture of claim 12, wherein said means for deactivating said first functional mode further comprises means for:

requesting a first active software module, said first active software module supporting said first functional mode, to terminate a logical software link to said telephone terminal, by said interface module.

14. The article of manufacture of claim 12, wherein said means for activating said second function mode further comprises means for:

requesting a second active software module, said second active software module supporting said second functional mode, to establish a logical software link to said telephone terminal, by said interface module.

15. A communications system supporting a plurality of telephone terminals, said communications system comprising:

a first software module for supporting a first functional mode for a first portion of said plurality of telephone terminals;

a second software module for supporting a second functional mode for a second portion of said plurality of telephone terminals;

a third software module for supporting a third functional mode for a third portion of said plurality of telephone terminals; and an interface module for receiving a request from at least one of said plurality of telephone terminals operating in said first functional mode to change the functional mode of said at least one telephone terminal to said second functional mode, wherein said first, second, and third functional modes allow said telephone terminal to invoke service features designed for each of said respective first, second, and third functional modes;

wherein said first software module comprises a regular user functional mode, wherein said second software module comprises an operator software module for supporting an operator functional mode, and wherein said third software module comprises an automatic call distribution agent software module for supporting an automatic call distribution agent functional mode.

16. The communications system of claim 15, further comprising:

a first plurality of logical software links for associating said first portion of said plurality of telephone terminals with said first software module;

a second plurality of logical software links for associating said second portion of said plurality of telephone terminals with said second software module; and a third plurality of logical software links for associating said third portion of said plurality of telephone terminals with said third software module.

17. The communications system of claim 16, further comprising:

means for terminating, responsive to receiving said request by said interface module, one of said first plurality of logical software links, said one of said first plurality of logical software links associating said at least one telephone terminal to said first software module.

18. The communications system of claim 17, further comprising:

means for establishing, responsive to terminating said one of said first plurality of logical software links, a logical software link associating said at least one telephone terminal to said second software module.

* * * * *

UNITED STATES PATENT AND TRADEMARK OFFICE
CERTIFICATE OF CORRECTION

PATENT NO. : 6,400,817 B1
DATED : June 4, 2002
INVENTOR(S) : Kao-Ping Su and Hani Al-Hemsi

It is certified that error appears in the above-identified patent and that said Letters Patent is hereby corrected as shown below:

Column 1,
Line 5, insert
-- BACKGROUND OF THE INVENTION
    Technical Field of the Invention
    The present invention is related to Private Branch Exchanges and more particularly, to setting functional modes with a multiple-function digital telephone set. --
After the Title "MULTIPLE-FUNCTION DIGITAL TELEPHONE SET IN A PRIVATE BRANCH EXCHANGE"

Signed and Sealed this

Twenty-second Day of October, 2002

*Attest:*

JAMES E. ROGAN
*Attesting Officer*     *Director of the United States Patent and Trademark Office*